US008580326B2

(12) United States Patent
Dolezal, Jr. et al.

(10) Patent No.: US 8,580,326 B2
(45) Date of Patent: Nov. 12, 2013

(54) TREATING MEAT FROM DARK-CUTTING CARCASSES USING AN ACIDIFICATION PROCESS

(75) Inventors: Howard G. Dolezal, Jr., Derby, KS (US); Dave McKenna, Witchita, KS (US); Daniel L. Schaefer, Maize, KS (US); Rudy Steiner, Witchita, KS (US)

(73) Assignee: Cargill, Incorporated, Wayzata, MN (US)

( * ) Notice: Subject to any disclaimer, the term of this patent is extended or adjusted under 35 U.S.C. 154(b) by 1939 days.

(21) Appl. No.: 10/826,957

(22) Filed: Apr. 8, 2004

(65) Prior Publication Data

US 2005/0226989 A1 Oct. 13, 2005

(51) Int. Cl.
*A23B 4/023* (2006.01)

(52) U.S. Cl.
USPC ............ 426/264; 426/265; 426/266; 426/641

(58) Field of Classification Search
USPC .......................................... 426/264–266, 641
See application file for complete search history.

(56) References Cited

U.S. PATENT DOCUMENTS

| | | | | |
|---|---|---|---|---|
| 3,526,521 | A | * | 9/1970 | Komarik ...................... 426/332 |
| 3,666,488 | A | * | 5/1972 | Nakao et al. .................. 426/266 |
| 4,016,292 | A | | 4/1977 | Hood |
| 4,060,644 | A | | 11/1977 | Braid |
| 4,576,825 | A | * | 3/1986 | Tracy et al. ................... 426/266 |
| 5,736,186 | A | * | 4/1998 | Holdren et al. ............... 426/646 |
| 6,379,739 | B1 | * | 4/2002 | Formanek et al. ............ 426/650 |
| 2002/0054941 | A1 | * | 5/2002 | Calkins et al. ................ 426/281 |
| 2003/0180439 | A1 | * | 9/2003 | Paterson et al. .............. 426/641 |

FOREIGN PATENT DOCUMENTS

| | | |
|---|---|---|
| EP | 5 514 1177 | 11/1980 |
| EP | 0 406 6071 | 7/1990 |
| EP | 0 437 0058 | 12/1992 |
| EP | 0 914 0365 | 6/1997 |
| GB | 968331 | 9/1960 |
| GB | 938711 | 10/1963 |
| GB | 1052782 | 12/1966 |
| WO | WO 2004/040986 A2 | 5/2004 |

OTHER PUBLICATIONS

Wulf et al. Relationships among glycolytic potential, dark cutting (dark, firm, and dry) beef, and cooked beef palatability. 2002 Journal of Animal science. 80:1985-1903.*
Jungbunzlauer, *Glucono-delta-Lactone*, www.jungbunzlauer.com/products/product_15.html bearing a designation of Jun. 9, 2003 (4 sheets).
PMP Fermentation Products, Inc., *Eribate® Fish Products*, www.pmpinc.com/product/eribate/fish.html bearing a designation of Jun. 9, 2003 (3 sheets).
Glucona America, Inc., *Function of GdL in Meat Products*, Glucona America, Inc. literature (1 sheet).
Food Marketing & Manuacturing, *Delaying Tactics for GdL . . .*, Jul. 2001, www.tastetech.co.uk/fmm72001.htm bearing a designation of Jul. 1, 2003 (1 sheet).

(Continued)

*Primary Examiner* — Vera Stulii

(57) ABSTRACT

A system and method for treating dark-cutter meat includes contacting the meat with one or more acidulants in an amount and for a time sufficient to allow the acidulant to hydrolyze and decrease the pH level of the meat. The acidulant may be added to the meat by injecting, marinating, spraying, or rubbing.

33 Claims, 8 Drawing Sheets

(56) References Cited

OTHER PUBLICATIONS

Ann Juttelstad, *The Best of the Wurst*, Food Product Design: Design Elements—The Best of the Wurst, May 1999—Design Elements, p. 1-7, www.foodproductdesign.com/archive/1999/0599de.html bearing a designation of Jul. 1, 2003 (7 sheets).

J.D. Eilers, J.D. Tatum, J.B. Morgan, G.C. Smith, *Modification of Early-Postmortem Muscle pH and Use of Postmortem Aging to Improve Beef Tenderness*, Department of Animal Sciences, Colorado State University, Fort Collins, CO 80523, p. 790-798.

I.V. Moiseev, D.P. Cornforth, *Treatments for Prevention of Persistent Pinking in Dark-Cutting Beef Patties*, Journal of Food Science, vol. 64, No. 4, 1999, p. 738-743.

Canadian Food Inspection Agency, *HACCP Generic Model: Fermented Smoked Sausage*, Oct. 1, 1997, www.inspection.gc.ca/english/fssa/polstrat/haccp/smsaufumie.shtml bearing a designation of Jun. 27, 2003 (3 sheets).

Dorte Juncher et al., *Effects of chemical hurdles on microbiological and oxidative stability of a cooked cured emulsion type meat product*, Meat Science, vol. 55 (2000), p. 483-491.

U.S. Food and Drug Administration, *Title 21—Food and Drugs, Part 184—Direct Food Substances Affirmed as Generally Recognized as Safe*, CFR Title 21, Sep. 24, 1986 (pp. 1-2).

\* cited by examiner

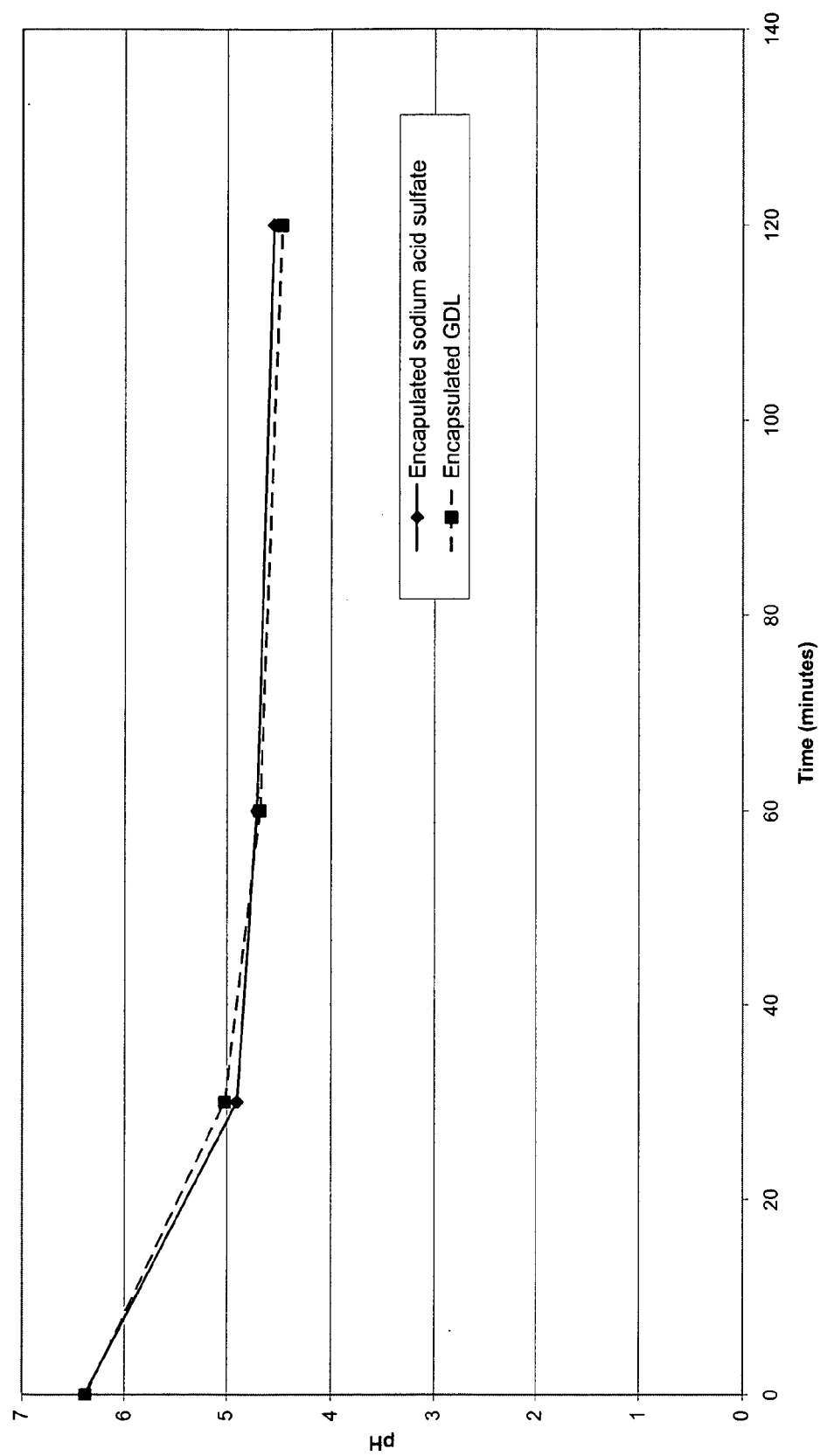

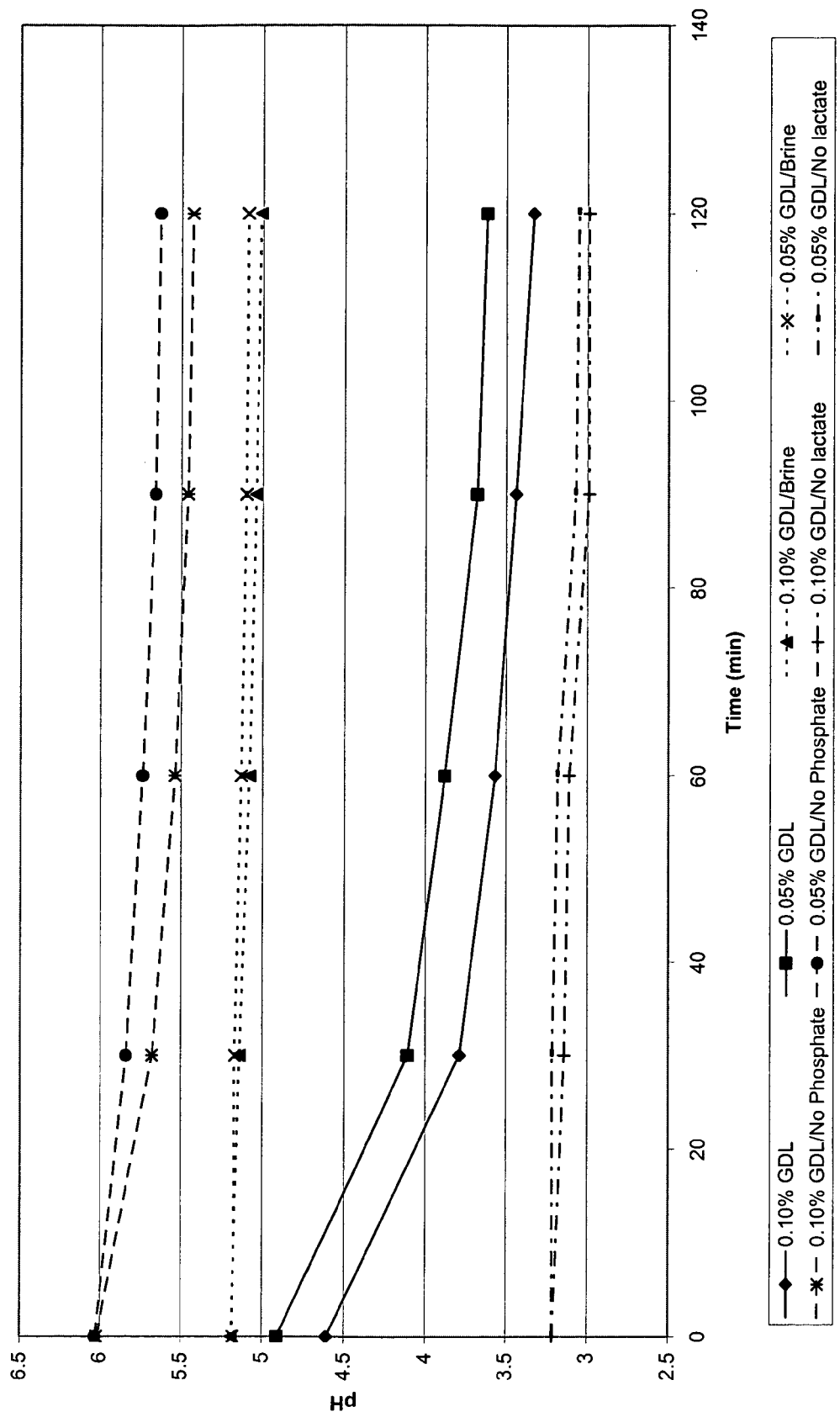
Figure 3. pH declines in brines comprising different concentrations of GDL

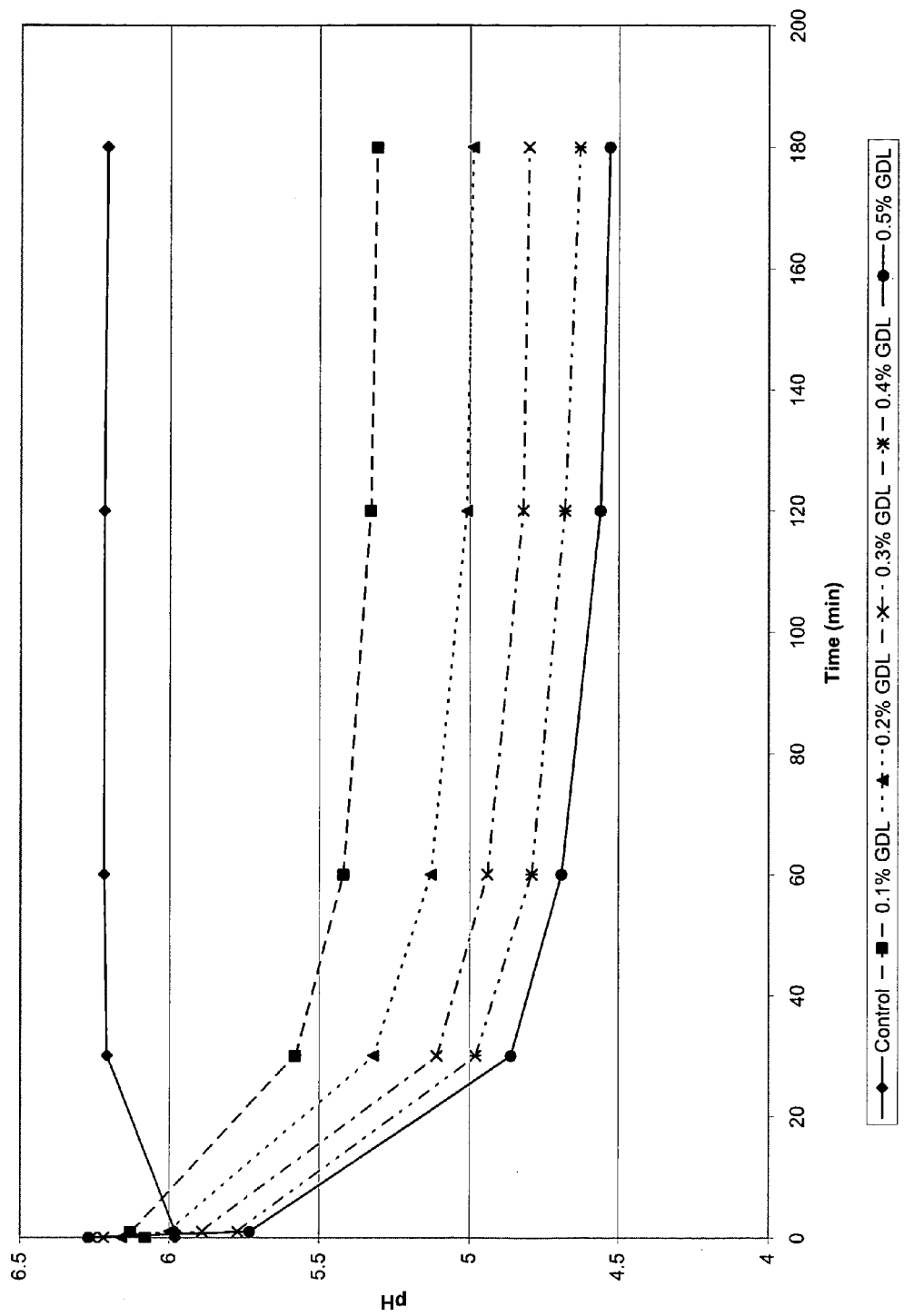

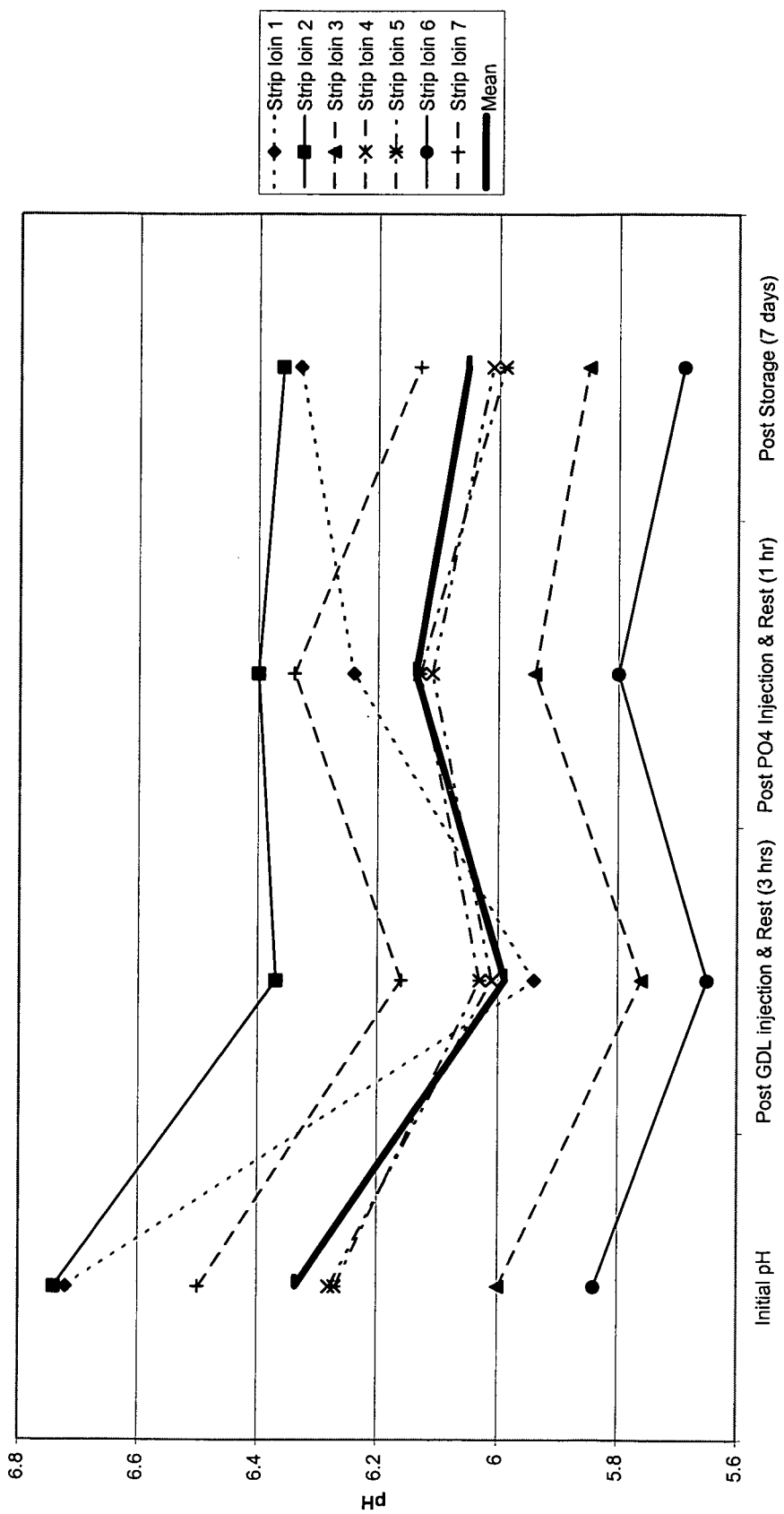
Figure 5 pH measures from beef strip loins at points throughout the processing system

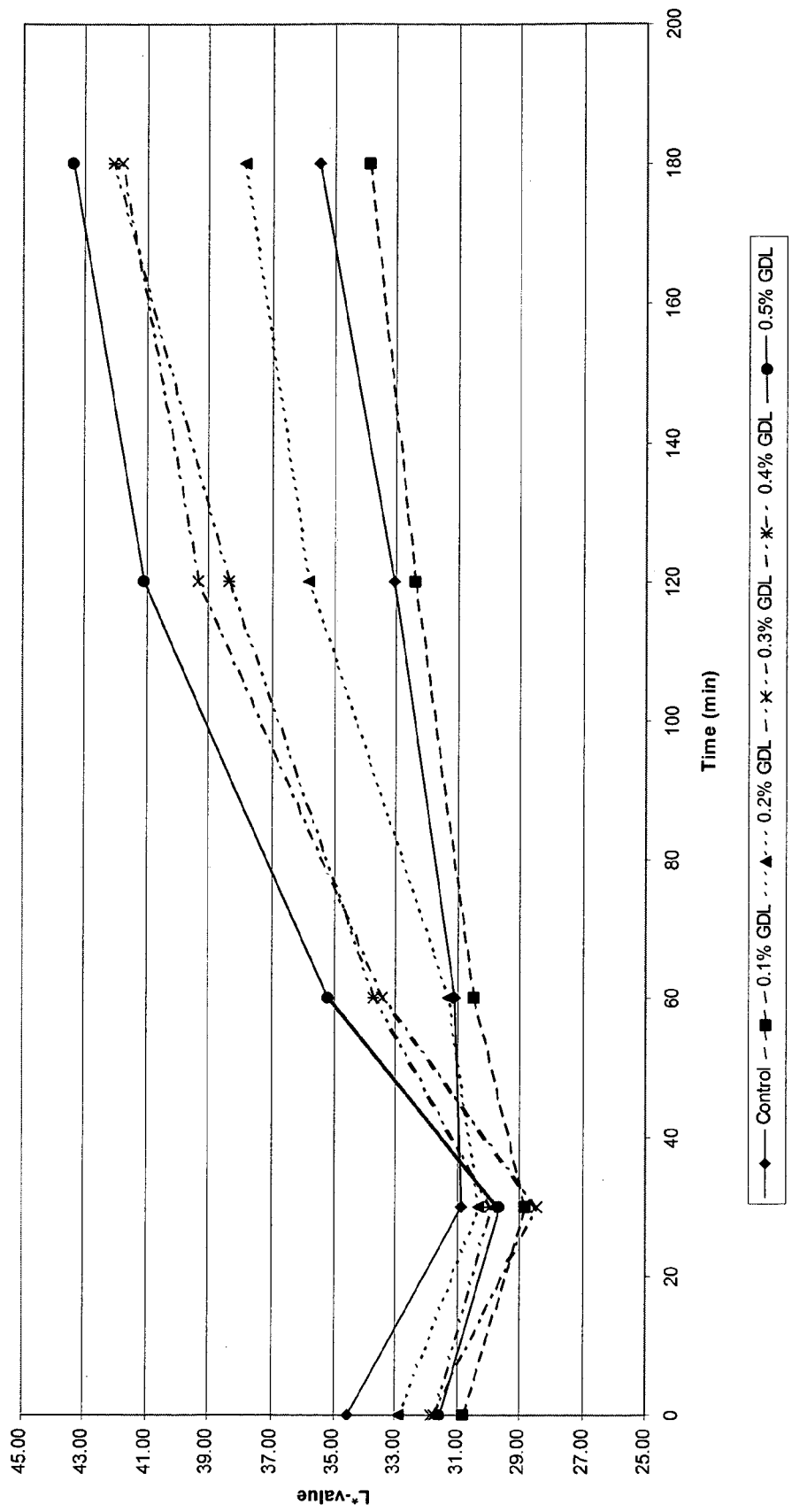
Figure 6. L*-values for muscle samples soaked in brines containing different levels of GDL

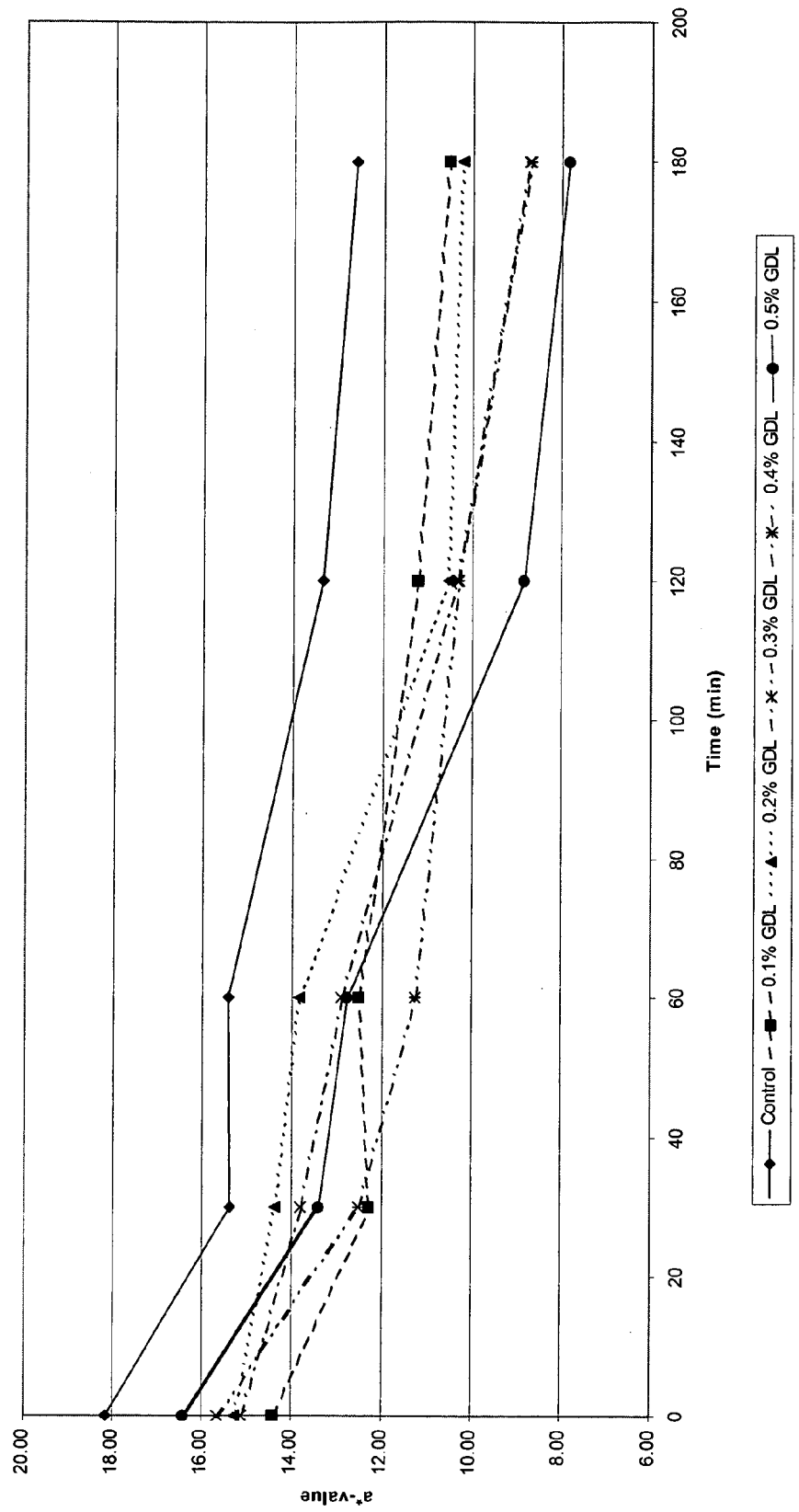

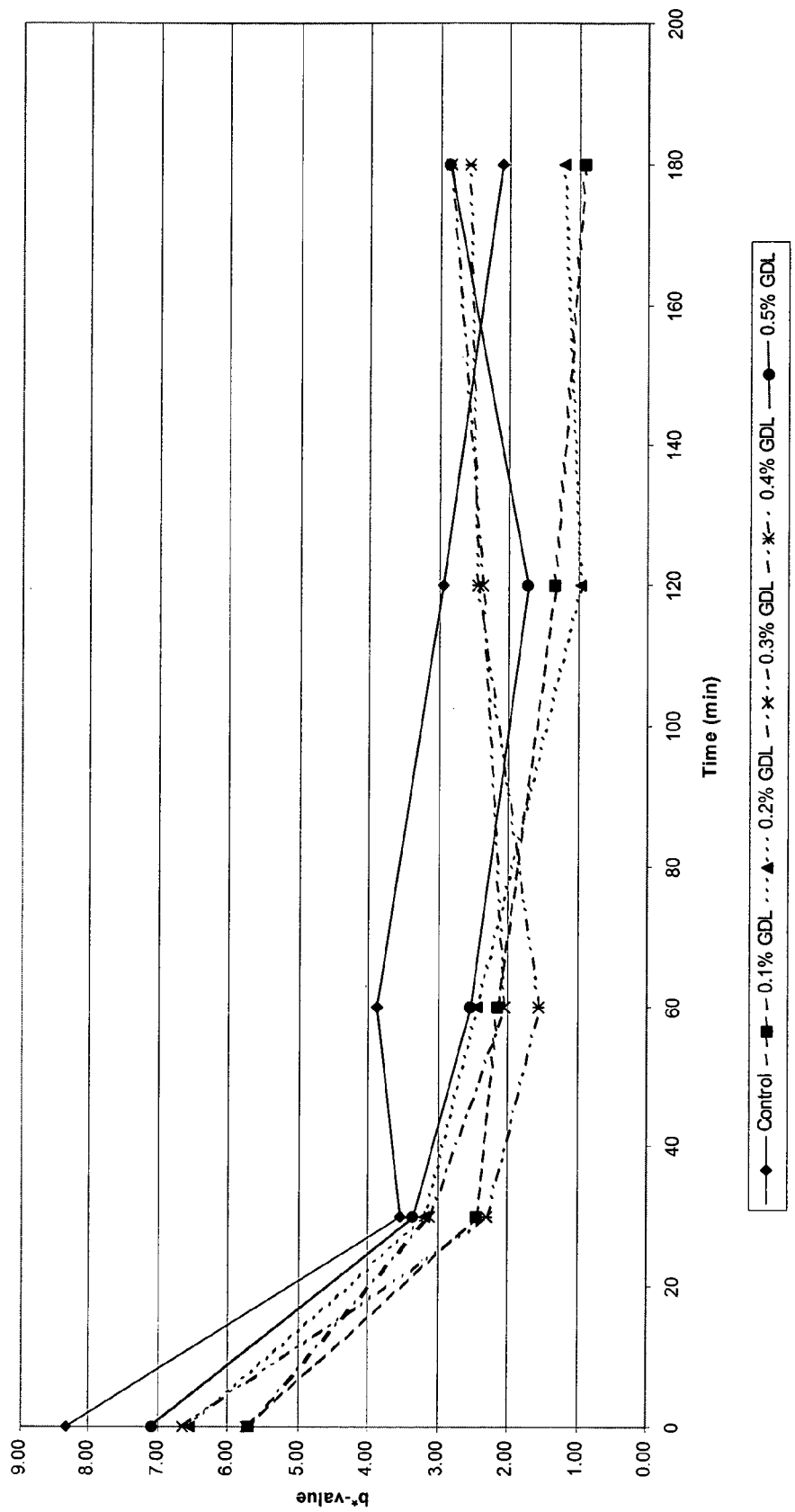

TREATING MEAT FROM DARK-CUTTING CARCASSES USING AN ACIDIFICATION PROCESS

FIELD OF THE INVENTION

The present invention relates to a method for improving the appearance of meat derived from a dark-cutting fresh-meat slaughter animal. More specifically, it relates to a process by which fresh dark-cutter meat is treated with a pH-lowering agent to ameliorate the dark color of the muscle.

BACKGROUND

From the point of slaughter until the onset of rigor mortis, glycogen present in the muscles of carcasses is metabolized and converted to lactic acid. As lactic acid accumulates, the pH of muscle is gradually decreased. At the time of slaughter, muscle pH in red meat (e.g. bovine) animals is typically in the range of 7.0 to 7.4; however, at the time of onset of rigor mortis, muscle pH has typically dropped to a range of 5.5 to 5.8. The amount of lactic acid produced, and thus the final pH of muscle, is dependent upon the amount of glycogen present in muscle at the time of slaughter. If muscles have low levels of glycogen at slaughter, then they will have a limited capacity to produce lactic acid and consequently have a higher pH at the time of rigor mortis.

In the case of bovine animals, most cattle arrive at slaughter facilities with normal levels of muscle glycogen. In some instances, stressors, such as management practices, weather, feeding, illness or transportation, can result in depleted muscle glycogen levels before slaughter. When such stress occurs, muscles lack the glycogen quantities necessary to reduce the pH of muscles to normal postmortem levels (pH −5.5 to 5.8) and have high final pH's (>6.2). The pH affects many of the characteristics of muscle. For example, higher pHs may allow muscles to retain greater amounts of water, which results in abnormal light scattering properties. The net result is that these animals produce muscles that have a dark burgundy/purple appearance.

Carcasses presenting muscles that are dark in appearance are commonly referred to in the art as "dark-cutting," "dark-cutters," or "dark, firm, and dry (DFD)." Currently, dark cutting beef carcasses are identified at the point in the meat preparation process where USDA quality and yield grading occurs. This location is the first point within the process where muscle tissue is cut and exposed (i.e., ribbing between the $12^{th}$ and $13^{th}$ rib as prescribed for grading procedures). When a carcass is identified as a dark cutter, it is sorted out from carcasses destined for normal production. Although palatability characteristics and wholesomeness of meat from dark cutting carcasses is not different from meat derived from carcasses presenting a normal red color, dark-cutting carcasses yield meat that commands a substantially lower price than meat from non-dark-cutting carcasses. Consumers identify the appearance of muscles from dark-cutting carcasses as unappealing and unwholesome and consequently strongly discriminate against these products when they are sold via normal retail markets. As such, retailers are unwilling to purchase muscles from dark cutters, forcing packers to merchandise these products at vastly reduced prices. Moreover, meat from dark cutters is not used in fully-cooked and pre-cooked items such as prime rib and roast beef products because the internal color of meat from dark-cutters remains more red than meat from normal carcasses processed in the same manner. This increased redness may lead to consumer perception that these products were not cooked properly and thus limits the use of meat from dark-cutters in cooked meat operations. Thus, there is a need in the art for a method of treating meat from dark-cutting carcasses to ameliorate the dark color.

SUMMARY OF THE INVENTION

The present invention provides methods for ameliorating the dark color of dark-cutting meat, including muscle meat. Meat used in the present invention may be red meat (including but not limited to beef, pork, lamb, veal) or seafood, poultry (including but not limited to chicken, turkey, ostrich). The present invention also provides meat products derived from dark-cutting carcasses, but which are redder and/or have lower pH than typical meat from dark-cutting carcasses identified at grading.

According to some embodiments, a process for altering the color of dark-cutting meat, including muscle meat, is provided.

The process includes identifying a dark-cutting meat and contacting the dark-cutting meat with at least one pH-lowering agent in an amount sufficient to alter the color of at least a portion of the dark-cutting meat. In some embodiments, the at least one pH-lowering agent is at least one acidulant. In some embodiments, the amount of pH-lowering agent is sufficient to alter the color from a dark burgundy/purple color to a red color, similar to the red color presented by non dark-cutting carcasses. In some embodiments, the process includes contacting the dark-cutting meat with at least one pH-lowering agent in an amount sufficient to alter the color of substantially the entire dark-cutting meat. In this context, the term "substantially" means that portions of the meat may not appear to have altered color as an inherent by-product of the treatment process. For example, pH-lowering agent may be injected into the meat sample, however the pH-lowering agent may become trapped in injection pockets and may not therefore equilibrate throughout the meat sample. Accordingly, portions of the meat may not present an altered color.

According to some embodiments, a process for reducing the pH of meat from dark-cutters is provided, which includes contacting a dark-cutting meat with an amount of pH-lowering agent sufficient to lower the pH of at least a portion of the dark-cutting meat, such as beef, below its pH level at grading ("grading pH"). In some embodiments, the pH-lowering agent is at least one acidulant. In some embodiments the amount of pH-lowering agent is sufficient to lower the pH of the dark-cutting meat from a grading pH of from about 6.3 to about 6.8 to a pH of from about 5.4 to about 6.1. In some embodiments the amount of pH-lowering agent is sufficient to lower the pH of the dark-cutting meat from the grading pH to about pH 5.4 to about pH 5.9. In some embodiments the amount of pH-lowering agent is sufficient to lower the pH of the dark-cutting meat from the grading pH about pH 5.5 to about pH 5.8. In some embodiments, the amount of pH-lowering agent is sufficient to lower the grading pH at least about 0.2 pH units. In some embodiments, the amount of pH-lowering agent is sufficient to lower the pH of the dark-cutting meat from the grading pH by at least about 0.2 pH units but no more than about 1.3 pH units. As used herein, the term "about" is intended to incorporate a range of experimental error inherent to any measuring system. Also, the word "about" should be understood to implicitly modify all measurements specified in the disclosure, unless otherwise indicated. In some embodiments, the process includes adding pH-lowering agent in an amount and in a manner sufficient to lower the pH of substantially the entire dark-cutting meat being treated. In some embodiments, the process includes introducing a buffering agent independently from or in combination with contacting the dark-cutting meat with a pH-lowering agent to reduce or stop residual acidification. The buffering agent may also be used to stabilize the pH of the dark-cutting meat at a pH of 5.4 to 6.1, In some embodiments, the buffering agent is a high pH phosphate. A high pH phosphate is understood to be a phosphate with a pH greater than 7.

According to some embodiments, a meat product incorporating a pH-lowering agent is provided. In some embodiments, the pH-lowering agent is at least one acidulant. In some embodiments, the meat product includes an amount of pH-lowering agent sufficient to alter the color of at least a portion of the meat from the original color of the meat at grading ("grading color"). In some embodiments, the pH-lowering agent is at least one acidulant and the meat product includes enough acidulant to alter the color of at least a portion of the dark-cutting meat reference from a dark burgundy/purple color typically associated with a dark-cutting carcass to a red color typically associated with meat from a non-dark cutting carcass. In some embodiments, the meat product contains enough acidulant to alter the color of substantially the entire dark-cutting meat reference from its original color at grading.

According to some embodiments, a meat product is provided which includes meat derived from a dark-cutting carcass and a pH-lowering agent in an amount sufficient to lower the pH of the meat below its pH at grading. In some embodiments, the pH-lowering agent is at least one acidulant. In some embodiments, the meat product includes an amount of acidulant sufficient to reduce the pH of the meat to a pH ranging from about 5.4 to about 6.1.

While multiple embodiments are disclosed, still other embodiments of the present invention will become apparent to those skilled in the art from the following detailed description, which shows and describes illustrative embodiments of the invention. As will be realized from the description herein, the invention is capable of modifications in various aspects, all without departing from the spirit and scope of the present invention. Accordingly, the drawings and detailed description are to be regarded as illustrative in nature and not restrictive.

BRIEF DESCRIPTION OF THE DRAWINGS

FIG. 2 is a graph depicting pH declines in brines for lipid-encapsulated acidulants.

FIG. 3 is a graph depicting pH declines in brines comprising different concentrations of an acidulant (glucono-delta-lactone).

FIG. 4 is a graph depicting pH declines in brines comprising different concentrations of an acidulant (glucono-delta-lactone) and further comprising samples of beef muscle.

FIG. 5 is a graph depicting pH measures in beef muscle treated with an acidulant (glucono-delta-lactone) during different phases of treatment and storage.

FIG. 6 is a graph depicting L* values from samples of beef muscle treated in accordance with a method of the invention.

FIG. 7 is a graph depicting a* values from samples of beef muscle treated in accordance with a method of the invention.

FIG. 8 is a graph depicting b* values from samples of beef muscle treated in accordance with a method of the invention.

DETAILED DESCRIPTION

Figure 1:
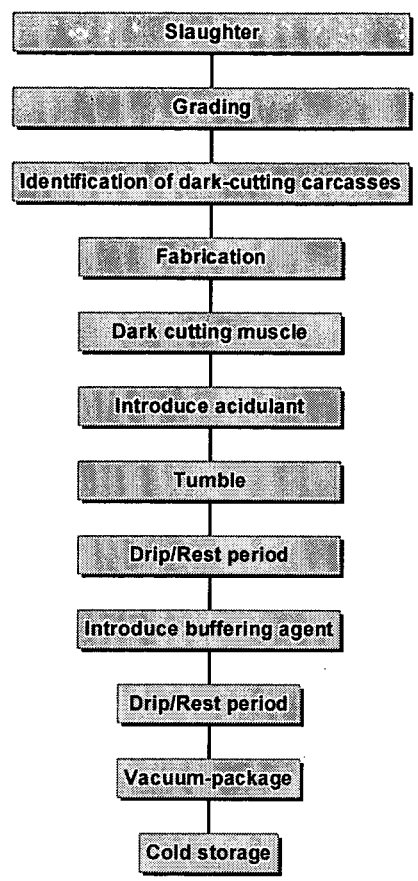
FIG. 1 is a flowchart showing a meat processing method including a muscle treatment method according to one embodiment of the present invention.

FIG. 1 is a flowchart illustrating a method of processing meat 10 including, but not limited to, beef muscle meat. The processing method 10 includes four general stages: identification of dark-cutter carcasses 12, fabrication of dark-cutter meat 14, treatment of dark-cutter meat 16 in accordance with an embodiment of the present invention, and packaging of meat 18. A person of ordinary skill should recognize from the description herein, that the meat treatment stage 16 need not occur directly after the fabrication stage 14, but may occur at any point in the meat processing method 10 after identification of dark-cutter carcass. For example, the treatment stage 16 could be adapted to occur prior to fabrication 14 or simultaneously with packaging 18. Further, a person of ordinary skill should recognize from the description herein that the process for treating meat 16 is capable of other embodiments. Consequently, the description of the particular overall process 10 in FIG. 1 and particular treatment methods here and elsewhere in the application are exemplary only, and should not be taken to be limiting.

As indicated above, an exemplary method of processing meat 10 includes four stages: identification of dark-cutting carcasses 12, fabrication of dark-cutter meat 14, treatment of dark-cutter meat 16, and packaging of meat 18. In order to identify the dark-cutter meat 12, an animal is slaughtered 20. After slaughter 20 and onset of rigor, the USDA quality and yield grade is determined ("grading") 22. Dark-cutting carcasses can be identified 24, during grading 22, a point in the processing method 10 where muscle tissue is cut and exposed. Dark-cutting carcasses can be identified visually, as the muscles present a dark burgundy/purple appearance in contrast to the red appearance of non dark-cutting carcass muscles. Observation of the appearance of the muscles may occur within the first several days after slaughter of the animal. Preferably, observation occurs after sufficient time has passed to allow conversion of all or substantially all glycogen present in the muscles to convert to lactic acid. Typically, the conversion takes 24 hours.

Fabrication of carcasses involves disassembling carcasses by, for example, cutting the carcasses up into cuts that are then packaged and sold by the packer. In the case of bovine carcasses, such pieces may be primal and sub-primal cuts. Once dark-cutting carcasses are identified, these carcasses are often separated out by the packer and fabricated 14 separately or sold to other meat processors at a substantial discount to what the packer would otherwise have obtained from sale of the carcass or products obtained from fabrication of non-dark-cutting carcasses.

In the exemplary meat processing method 10, muscle is treated 16 after fabrication 14, and packaged 18 after treatment 16. The packaging process 18 can include packaging 34 and storing 36. While meat products according to the invention can be used in any type of packaging used for muscle cuts (for example, lidstock and overwrap), vacuum packaging is illustrated in the exemplary meat processing method 10. Optionally, a packaging environment is chosen that can enhance the treatment process 16. For example, a packaging environment can be chosen that can assist with altering the color of the meat or that can help maintain the color of the meat. In one embodiment, steaks and other cuts from treated muscles may be displayed using a modified atmosphere packaging environment, where a modified atmosphere may be described as any environment containing greater or lesser amounts of gaseous compounds than are found in air. Common gasses used in modified atmospheres include, but are not limited to, oxygen, nitrogen, carbon dioxide, and carbon monoxide. In another embodiment, steaks and other cuts from treated muscles may be displayed in atmospheric conditions using a polyvinylchloride film. In another embodiment, steaks and other cuts from treated muscles may be sold as vacuum-packaged cuts.

The treatment process 16, can include introduction 30 of an acidulant to the muscle, and a first drip/rest period 34, to allow excess acidulant or acidulant solution to drip off and/or to provide time for the acidulant to equilibrate and act. To assist incorporation 30 of the acidulant into the muscle, the treatment process can also include a tumbling step 32. A purpose of tumbling 32 the muscle can be to aid in distributing the acidulant in the muscle and to provide time for the acidulant to act. Optionally, the tumbling 32 may be accomplished using a horizontal vacuum tumbler. The treatment process 16 can also optionally include introduction of a buffering agent 36 to slow or stop the decrease of pH in the dark-cutting muscle after introduction of the pH lowering agent and also to stabilize the pH of the dark-cutting muscle. The treatment process 16 can also include a second drip/rest period 38 following introduction of the buffering agent 36. The second drip/rest period 38 can be optionally chosen when the buffering agent is added in a separate step from the acidulant. A person of ordinary skill can select an appropriate duration for the drip/rest periods based on the amount and the type of pH-lowering agent used, as well as additional ingredients that may be present. For example, different pH-lowering agents may require a different length of time to act and the presence of other ingredients may have an impact on the ability or length of time required for a pH-lowering agent to act. The duration of the drip/rest periods can also depend on the desired amount of reddening and/or pH-lowering. Similarly, a person of ordinary skill can select an appropriate parameters for the tumbling process taking into account factors such as those discussed in connection with the drip/rest period.

Any of a variety of acidulants may be introduced to the muscle, singularly or in combination. For example, the acidulant may be an organic acid such as acetic acid, citric acid, fumaric acid, gluconic acid, lactic acid, malic acid, phosphoric acid, succinic acid or tartaric acid. As another example, the acidulant may be glucono-delta-lactone (GDL). GDL is also called D-gluconic acid delta lactone or D-glucono-1,5-lactone and is a neutral cyclic 1,5-intramolecular ester of D-gluconic acid. Other (non-limiting) exemplary acidulants include sodium acid sulfate and calcium sulfate.

The total amount of acidulant can vary, but should be sufficient to alter the color and/or lower the pH of the dark-cutter muscle from its color and/or pH at grading. To determine whether sufficient acidulant has been added, the color or pH of the treated muscle can be compared to the treated muscle's color or pH at grading, or the color or pH of the treated muscle can be compared to a dark-cutting reference meat. The phrase "total amount of acidulant" is used to account for the possibility of more than one acidulant. In other words, if one acidulant is used to treat the muscle, the total amount of that one acidulant should be sufficient to alter the color and/or lower the pH of the dark-cutter muscle from its color and/or pH at grading. Similarly, if three different acidulants are used, the combined total amount of acidulant should be sufficient to alter the color and/or lower the pH of the dark-cutter muscle from its color and/or pH at grading. Preferably, the total amount of acidulant should not be so great as to cause "burn" or brown discoloration. Generally, the total amount of acidulant added is based on: the initial pH of the muscle; the desired final pH of the muscle; the specific acidulant(s) as each acidulant may contribute different levels of acidification at different inclusion levels; the concentration of acidulant(s); and the other ingredients that may be added to muscles during processing (e.g. ingredients included in brines, spices, or seasons, or antimicrobial agents). For example, in some embodiments, an increased amount of acidulant may be added if a buffering agent is also added. Initial pH is understood to mean the pH of the muscle at the identification stage 26.

In some embodiments, the muscle is treated with a total amount of acidulant ranging from greater than 0% to about 10% of the green weight of the muscle. It should be understood that green weight means the weight of the muscle after fabrication 14 but prior to addition of other ingredients. Thus, a meat sample having a green weight of 10 g and treated with 5% acidulant would weigh 105 g. In some embodiments, the muscle is treated with a total amount of acidulant ranging from greater than 0% to about 2% of the green weight of the muscle. In some embodiments, the acidulant is GDL and the muscle is treated with an amount of GDL ranging from about 0.05% to 1.0% GDL of the green weight of the meat, optionally in the range of about 0.3% to about 0.6% of the green weight of the meat. GDL is generally recognized as safe (GRAS) and can be used in food with no limitation other than current good manufacturing practice. Any food grade GDL meeting the FDA requirements set forth in 21 CFR §184.1318 can be used in the invention. In another embodiment, the muscle is treated with sodium acid sulfate in an amount ranging from about 0.1% to about 0.3% of the green weight of the muscle.

The acidulant should preferably be introduced in a manner that alleviates or prevents brown discoloration. Too much acidification, or too rapid acidification can lead to protein denaturation and brown discoloration. One approach to prevent or alleviate this less desirable result, is to add a buffering agent along with the acidulant(s) to alleviate or stop the acidification process. By "along with" it is contemplated that the buffering agent can be added together with or independently from the acidulant(s). An alternative or additional approach to preventing or alleviating brown discoloration is to protect acidulants via encapsulation or time-release agents to produce a slower acidification of muscle. One approach to encapsulation may be lipid encapsulation wherein the lipid used for encapsulation is included at 20% to 80% (by weight) of the lipid encapsulated acidulant product. Stearic and palmitic acid can be used in the encapsulation, however other lipids may also be used. Sodium acid sulphate can be obtained commercially (pHase, Jones-Hamilton Co., Walbridge, Ohio)

Introduction of acidulant may be accomplished using various techniques, including but not limited to: injecting, marinating, spraying, and rubbing. Introduction of acidulant may also be accomplished at the time the animal is slaughtered via post-exanguination vascular infusion allowing the animal's vascular system carry and distribute the acidulant to the muscle. Examples 2, 4, and 7 below illustrate non-limiting injection alternatives. Example 5 below illustrates a non-limiting marination process. According to an embodiment of the invention, more than one acidulant is incorporated into the muscle, either serially or in combination. According to another embodiment of the invention, the one or more acidulants are incorporated into the muscle by injection. According to an embodiment of the invention, the one or more acidulants are part of a brine solution and are incorporated into the muscle using a system known in the art for injecting brine into muscle products. Brine ingredients include, by way of example, water, sodium chloride, stock (such as beef stock), lactate, antioxidants (such as rosemary extract), and/or phosphate. Thus, one embodiment of the invention may be injection of at least one acidulant in water. Another embodiment of the invention may be injection of glucono-delta-lactone dissolved in water. According to another embodiment of the invention, other ingredients are added with the acidulant(s) to accelerate the process of color change. For example, in one embodiment, erythorbate or ascorbic acid are used together with the acidulant.

pH measurements of meat, including muscle meat, may be taken using a handheld probe, (pHStar, SFK Technologies, Inc., Peosta, Iowa). The instrument may be calibrated before use using standard buffers (pH 4 and pH 7). After calibration, instrument is inserted into meat and measurements are recorded by the instrument. Typically, multiple measurements are taken on a muscle to account for possible pH variation in muscles.

EXAMPLE 1

Brines were formulated according to Table 1 and for a targeted injection level of 12% of the green weight of the meat. Targets for percentage of ingredients in the final product were: sodium chloride—about 0.20%; phosphate—about 0.35%; potassium lactate—about 2.5%; beef stock—about 0.05%; and GDL—about 0.05% or about 0.10%. A low pH phosphate (pH approximately 4) was used in this study (Joha® K, BK Giulini, Simi Valley, Calif.). Actual ingredient formulations for brines are shown in Table 1. GDL was the last ingredient added to the brine and was added immediately before pH was recorded. Brines were maintained at room temperature (21° C.) and pH of each brine was determined every 30 minutes for 2 hours.

TABLE 1

Brine formulations for Example 1

| Ingredient | 0.10% GDL | 0.05% GDL | 0.10% GDL/ Brine | 0.05% GDL/ Brine | 0.10% GDL/ No Phosphate | 0.05% GDL/ No Phosphate | 0.10% GDL/ No Lactate | 0.05% GDL/ No Lactate |
|---|---|---|---|---|---|---|---|---|
| Water | 498.31 | 498.56 | 484.06 | 484.30 | 485.80 | 486.06 | 496.60 | 496.80 |
| Salt | 1.00 | 1.00 | 1.00 | 1.00 | 1.00 | 1.00 | 1.00 | 1.00 |
| Phosphate | — | — | 1.75 | 1.75 | — | — | 1.75 | 1.75 |
| Lactate | — | — | 12.50 | 12.50 | 12.50 | 12.50 | — | — |
| Stock | 0.195 | 0.195 | 0.195 | 0.195 | 0.195 | 0.195 | 0.195 | 0.195 |
| GDL | 0.50 | 0.25 | 0.50 | 0.25 | 0.50 | 0.25 | 0.50 | 0.25 |

FIG. 3 shows the pH of the various brines recorded periodically after formulation of each brine. These results indicate that GDL is effective in decreasing pH, and thus that GDL is an effective ingredient to use for acidification. When phosphate was included in the brine, the pH decline was less than brines without phosphate. Without being bound by theory, it is expected that the phosphate is serving as a strong buffering agent. When this buffering action is not desired, it may be appropriate to formulate brines without phosphate or with very little phosphate. It may be desirable to introduce phosphate to meats in a separate step, following treatment to alter color. Optionally, the phosphate may be introduced as a means of alleviating or stopping acidification and thus color and/or pH change.

In one embodiment, a brine comprising GDL is introduced into muscle meat and a brine comprising a buffer such as phosphate is introduced to stabilize muscle pH. In the GDL brines containing lactate without phosphate, a reduction in pH was observed, although not to the extent of the decline observed in the brines containing only GDL. Thus, inclusion of lactate in brines may enhance the ability to control the pH of the brine before it is injected so that it is not too acidic when injected into muscles.

EXAMPLE 2

This experiment was designed as a 3×3 latin-square design with 3 strips loins subdivided into 3 sections. Treatments consisted of 12% injection (i.e. 12 g of brine injected for every 100 g of green weight of the meat) such that the final concentration in the muscle was about 0.4% GDL, about 0.35% phosphate (pH 5.0) or about 0.35% phosphate (pH 4.5). Complete formulation for brines are shown in Table 2. Loin sections were injected using a hand-held stitch pump and each piece was injected in approximately 4 locations. Immediately after injection, loin sections were vacuum-tumbled for 20 minutes to distribute brine. After tumbling, a 1-inch thick steak was removed from each loin section and packaged in retail PVC overwrap. All steaks were placed in a retail display case and color was subjectively assessed.

TABLE 2

Brine formulations for Phase 2

| Ingredient (g) | GDL - 0.4% | PO4 - pH 5.0 | PO4 - pH 4.5 |
|---|---|---|---|
| Salt | 317.8 | 317.8 | 317.8 |
| Phosphate | — | 370.8 | 370.8 |
| Lactate | 2648.3 | 2118.7 | 1059.3 |
| Stock | 58.3 | 58.3 | 58.3 |
| Antifoam | 1.6 | 1.6 | 1.6 |
| GDL | 423.7 | — | — |
| Water | 7900.3 | 8482.9 | 9542.2 |

Results indicate that all brines improved the color of muscles from dark-cutting carcasses. Specifically, brine containing GDL showed the most improvement in color, however, low-pH phosphates also showed potential for improving color of muscles from dark cutting carcasses. Therefore GDL and low pH phosphates can be used as pH-lowering agents.

EXAMPLE 3

A beef strip loin was cut into 1-inch thick steaks. Two steaks were selected randomly and served as controls. The remaining steaks were weighed and placed in a vacuum-tumbler with 0.4% GDL brine. In addition to GDL, the brine also contained about 0.3% sodium chloride, 2.5% potassium lactate, 0.055% beef stock, 0.0015% antifoam, and water to total 100%. The brine used in this Example was formulated as follows: sodium chloride—2.8%; potassium lactate—23.3%; beef stock—0.51% antifoam—0.01%; GDL—3.7% Water—69.6% The brine was included at 12% of green weight (12 grams of brine for every 100 grams of meat). Steaks were tumbled for 20 minutes in a horizontal vacuum tumbler, and steaks absorbed all of the brine. Steaks were packaged in Styrofoam trays with PVC-overwrap film and placed in retail display cases. Color was subjectively evaluated.

Color differences between control steaks and those that were tumbled with GDL were apparent. Treated steaks had a lighter appearance than control steaks, however, color was still darker (and "muddier") than typical beef. It is expected that using greater quantities of acidulant and increasing the percentage of brine incorporated into steaks will result in greater improvements in color. Tumbling is a feasible method to incorporate and distribute acidulant brines into steaks, however, greater quantities of acidulant should further improve the color of steaks from dark-cutting beef carcasses. Further, packaging environments which increase oxygen penetration depth (i.e. high oxygen MAP) into beef cuts from dark cutters may further improve color.

EXAMPLE 4

Beef strip loins were injected to 112% of their green weight using a commercial injector (50 needles) with a brine having the same formulation as the brine of Example 3, except containing 0.3% GDL. Strip loins were vacuum-tumbled for 20 min and then allowed to rest for four hours. A 1-inch thick steak was removed from each strip and packaged with PVC overwrap. The remainder of each strip was cut into 3 sections. The first section was vacuum-packaged and the other two were injected with a solution of phosphate having a pH of 8.5 (0.35% phosphate in the final product). Phosphate injected sections were allowed to rest for 20-min and then one 1-inch thick steak was removed from one of the sections and packaged with PVC overwrap. The remaining portion of each strip was vacuum-packaged. Vacuum-packaged strips (GDL, and GDL+$PO_4$) were stored for 1 week at 2° C. After storage, portions were removed from vacuum packages and a 1-inch thick steak was removed and packaged in PVC-overwrap. All steaks were placed in retail display for 7 days.

Subjective assessment of color was that 0.3% GDL was as effective as the 0.4% GDL used in Example 2. The commercial injector (50 needles) that was used in this Example appeared to improve the distribution of ingredients over the hand held stitch pump because fewer injection pockets. Thus, it is likely that other injectors having even more needles would yield even greater distribution of acidulant throughout the meat sample.

EXAMPLE 5

Brines were formulated to contain varying levels of GDL (0%, 0.1%, 0.2%, 0.3%, 0.4% or 0.5%). Brines formulations were similar to the brines of Example 4, except for differences in the percentage of GDL. pH was measured before addition of GDL and immediately after GDL was added. Cubes of muscle from dark cutting strip loins (n=2 strips steaks) were soaked in brines for 3 hours. pH of brines were recorded after 30-, 60-, 120-, and 180-minutes. In addition, objective color measures (Minolta L*-, a*-, and b*-values) of muscle cubes were recorded at 0-, 30-, 60-, 120-, and 180-minutes. The values obtained from these measurements are shown in FIGS. 6, 7, and 8. After soaking for 180-min, muscles cubes were blotted dry and over-wrapped with PVC film and placed in a retail display case. Objective color measures (Minolta L*-, a*-, and b*-values) were recorded 420-min after the experiment was initiated and every 24 hours from that point on. In general, measurements taken from the muscle cubes did not change significantly from the measurements taken from the muscle cubes did not change significantly from the measurements taken at 180 minutes.

The results indicate that GDL levels between 0.3-0.5% showed the greatest change in pH reduction of muscle tissue. Although GDL at each inclusion level effectively lowered pH, where a greater change in color is sought, it may be desirable to influence the pH of the interior of muscle to affect a greater change in color.

For GDL increases above 0.3%, it may be appropriate to handle product more carefully to maintain and encourage even distribution of GDL so that muscle areas are not denatured, for example on the surface of products. Although not exemplified, additional GDL beyond 0.5% may also be used. Further, different muscles may require higher levels of acidulants and the effectiveness of each level may be dependent on how the acidulant is applied to the muscle (i.e., injected, tumbled, rubbed, surface treatment). It should be noted that in some embodiments where the potential for over-acidification exists, for example those embodiments using amounts of GDL greater than 0.5%, to alleviate or prevent over-acidification, the process can optionally be modified to decrease the drip/rest period and follow-up with incorporation of phosphate or similar buffering agent sooner. Also, increasing the number of needles used to inject acidulant within the muscle may alleviate potential browning by avoiding creation of pockets.

EXAMPLE 6

Beef strip loins (n=7) were trimmed free of fat and initial pH values were measured using a handheld pH meter (pH-Star, SFK Technologies, Inc., Peosta, Iowa). pH measurements were collected in three locations on each strip loin and averaged (one in the cranial end, center, and caudal end at the origin of the *M. gluteus medius*). A 1-inch thick steak was removed from the cranial end of each strip loin and vacuum-packaged immediately to serve as controls for each strip loin in retail display. The remainder of each strip loin was injected with brine containing water, salt, potassium lactate, GDL, and beef stock in similar ratios to brine formulated for Example 3 at a 25% injection level. After injection, strip loins were vacuum tumbled for 20 minutes with no additional brine added to the tumbler and then allowed to drip and rest on stainless steel racks for approximately 3 hours. After resting for 3 hours, strip loins were re-injected with a phosphate solution (pH 8.5) at a 20% level and then allowed to drip and rest on stainless steel racks for an additional hour. It should be noted that although the meat was not tumbled after phosphate injection, the meat could optionally be tumbled. pH was measured on strip loins after each processing step using the procedures described previously. After resting, strip loins were vacuum-packaged and placed in cold storage with their corresponding control steaks for 7 days. After storage, strip loins were removed from vacuum-packages and the weight of purge was recorded to determine percentage purge loss. Strip loins were cut into 1-thick steaks and packaged on Styrofoam trays with PVC-overwrap and placed in a commercial retail display case for 5 days. Objective color measures (L*-, a*-, b*-values, Chroma, and Hue) were collected each day on all steaks (control and treated) using a Minolta CR-400 calorimeter. Each steak was measured in three locations and averaged. Means for steaks within each treatment category were averaged to determine the means reported in Table 3. It should be noted that visual inspection could be sufficient to determine color alteration.

TABLE 3

Least squares means for objective color measures for Example 6.

|  | L* | a* | b* | Chroma | Hue |
|---|---|---|---|---|---|
| Control | 38.08$^b$ | 8.81$^b$ | 3.30$^b$ | 9.49$^b$ | 19.25$^b$ |
| GDL - PO$_4$ | 39.05$^a$ | 13.51$^a$ | 6.68$^a$ | 15.08$^a$ | 26.28$^a$ |
| SEM* | 0.246 | 0.270 | 0.168 | 0.294 | 0.743 |

$^{a,b}$Least squares means within a column lacking a common superscript differ (P < 0.05).
*SEM is the standard error of the least squares means.

Individual and mean pH values for beef strip loins are shown in FIG. 5. GDL injection was an effective method to reduce the pH of strip loins with most loins decreasing approximately 0.3 pH units after treatment. A second injection using phosphate increased the pH values of strips and appeared to be effective in buffering out residual acidification activity as the pH values of strip loins only decreased approximately 0.1 pH units during the 7-day cold storage period. Yield data showed that the final pickup for strip loins was approximately 28% before storage and 22% after storage (i.e., minus purge). Injecting at lower percentage pumps may decrease the amount of purge.

Beef strip loins treated with the GDL-PO$_4$ processing method had much higher color values than control steaks, indicating that the color of treated steaks was brighter, and more cherry-red than control steaks. Discoloration was noticed on the periphery of treated steaks after 2-days of retail display. Without being limited by any particular theory, it is believed that this discoloration may be a result of over acidification of that area potentially because of the pre-trimming and tumbling steps currently used in the processing method.

EXAMPLE 7

Initial pH values of beef strip loins (n=10) were measured using a handheld pH meter (pHStar, SFK Technologies, Inc., Peosta, Iowa). pH measurements were collected in three locations on each strip loins and averaged (one in the cranial end, center, and caudal end at the origin of the M. gluteus medius). A 1-inch thick steak was removed from the cranial end of each strip loin and vacuum-packaged immediately to serve as controls for each strip loin in retail display. The remainder of each strip loin was injected with brine, formulated similarly to those brines in previous examples, containing water, salt, potassium lactate, GDL, and beef stock at a 12% injection level using a commercial injector with 175 needles. After injection, strip loins were split in half and the cranial portions were vacuum tumbled for 30 min and then allowed to drip and rest on stainless steel racks for approximately 4 hours. The caudal portions from each strip loin were not tumbled and immediately started their rest period. After resting for 4 hours, strip loins were re-injected to a 12% injection level with a solution containing phosphate (pH 8.5) and then allowed to drip and rest on stainless steel racks for an additional hour. pH was measured on strip loins after each processing step using the procedures described previously. After resting, strip loins were vacuum-packaged and placed in cold storage with their corresponding control steaks for 10 days. After storage, strip loins were removed from vacuum-packages and the weight of purge was recorded to determine percentage purge loss. Strip loins were cut into 1-thick steaks and packaged on Styrofoam trays with PVC-overwrap and placed in a commercial retail display case for 5 days. Objective color measures (L*-, a*-, b*-values, Chroma, and Hue) were collected each day on all steaks (control and treated) using a Minolta CR-400 calorimeter. No significant changes in color were observed during the observation period, therefore measurements for each display day were pooled to generate least squares means for each treatment (Table 4). The data indicate that the treatment used in this Example improved the color characteristics of beef strip loins obtained from a dark-cutting carcass.

TABLE 4

Least squares means for objective color values from strip loin steaks treated with an acidification process

|  | L* | a* | b* | Chroma | Hue |
|---|---|---|---|---|---|
| Control | 36.96$^a$ | 9.50$^b$ | 4.24$^b$ | 10.49$^b$ | 24.15$^a$ |
| Not-Tumbled | 35.81$^b$ | 12.39$^a$ | 5.06$^a$ | 13.41$^a$ | 21.72$^b$ |
| Tumbled | 36.62$^a$ | 12.21$^a$ | 5.05$^a$ | 13.25$^a$ | 21.83$^b$ |
| SEM* | 0.26 | 0.21 | 0.11 | 0.22 | 0.56 |

$^{a-b}$Means within a column lacking a common superscript are different (P < 0.05).
*SEM is the standard error of the least squares means.

Tumbling was an effective method to improve the uniformity of color in steaks, however, using injection alone was sufficient to improve the color of steaks. Results also indicated that injection with 175 needles improved color uniformity as compared to injection with 50 needles. Without being bound by theory, it is contemplated that increasing the number of needles results in greater distribution of brine in finer areas perhaps by reducing the number of injection or "hot pockets".

EXAMPLE 8

Brines incorporating encapsulated acidulants were formulated as follows:

| Ingredient formulation (all in grams) | | |
|---|---|---|
|  | Encapsulated GDL Brine - 0.4% | Encapsulated Sodium Acid Sulfate Brine - 0.01% |
| Salt | 12.7 | 12.7 |
| Phosphate | — | — |
| Potassium lactate | 105.9 | 105.9 |
| Beef stock | 2.3 | 2.3 |
| Antifoam | 0.1 | 0.1 |
| Acidulant | 29.7 | 0.5 |
| Water | 303.3 | 332.4 |

The pH of each brine was measured upon completing the formulation and periodically thereafter. FIG. 2 illustrates pH declines over time in brines formulated with encapsulated acidulants.

Although the present invention has been described with reference to preferred embodiments, persons skilled in the art will recognize that changes may be made in form and detail without departing from the spirit and scope of the invention.

We claim:

1. A method of treating meat, comprising: identifying meat in a dark-cutting carcass by evaluating grading pH and color, and after onset of rigor mortis contacting said meat derived from said dark-cutting carcass with an amount of at least one pH-lowering agent, wherein the meat has a grading pH and grading color of a dark burgundy/purple, and the amount of pH-lowering agent is sufficient to lower the pH and to lighten the color from the grading color of a dark burgundy/purple to a red color of at least a portion of said meat.

2. A method according to claim 1, wherein the at least one pH-lowering agent comprises at least one acidulant.

3. A method according to claim 2, wherein the grading pH ranges from about 6.3 to about 6.7.

4. A method according to claim 3, wherein the at least one acidulant comprises one or more of organic acids, GDL, sodium acid sulfate, and calcium sulfate.

5. A method according to claim 4, wherein the process further includes tumbling said meat.

6. A method according to claim 1, wherein said contacting comprises injecting said meat with a brine solution comprising said at least one pH-lowering agent.

7. A method according to claim 1, wherein said contacting comprises marinating said meat in a brine solution comprising said at least one pH-lowering agent.

8. A method according to claim 1, further comprising a drip/rest period.

9. A method according to claim 1, further comprising packaging said meat.

10. A method according to claim 1, wherein said at least one pH-lowering agent comprises an encapsulated form.

11. A method according to claim 1, further comprising contacting said meat with a buffering agent.

12. A method according to claim 11, wherein the amount of said buffering agent is sufficient to eliminate or reduce residual activity of at least one of said at least one pH-lowering agents in said meat.

13. A method according to claim 11, wherein said buffering agent comprises a phosphate solution.

14. A method according to claim 1, further comprising contacting said meat with one or more ingredients suitable for accelerating the action of at least one of said at least one pH-lowering agents.

15. A method according to claim 14, wherein the one or more ingredients suitable for accelerating the action of at least one of said at least one pH-lowering agents comprises one or more of erythorbate and ascorbic acid.

16. A method of treating meat, comprising: identifying a bovine carcass as a dark-cutting bovine carcass by evaluating grading pH and color and after onset of rigor mortis contacting meat derived from said dark-cutting bovine carcass with an amount of at least one pH-lowering agent, wherein the meat has a grading pH and grading color of a dark burgundy/purple, and the amount of pH-lowering agent is sufficient to lower the pH and to lighten the color from the grading color of a dark burgundy/purple to a red color of at least a portion of said meat.

17. A method according to claim 16, wherein the at least one pH-lowering agent comprises at least one acidulant.

18. A method according to claim 16, wherein the grading pH ranges from about 6.3 to about 6.7.

19. A method according to claim 17, wherein the at least one acidulant comprises one or more of organic acids, GDL, sodium acid sulfate, and calcium sulfate.

20. A method according to claim 18, wherein the process further includes tumbling said meat.

21. A method according to claim 16, wherein said contacting comprises injecting said meat with a solution comprising said at least one pH-lowering agent.

22. A method according to claim 16, wherein said contacting comprises marinating said meat in a solution comprising said at least one pH-lowering agent.

23. A method according to claim 16, further comprising a drip/rest period.

24. A method according to claim 16, further comprising packaging said meat prior to contacting said meat with said pH-lowering agent.

25. A method according to claim 16, further comprising packaging said meat after contacting said meat with said pH-lowering agent.

26. A method according to claim 16, wherein said at least one pH-lowering agent comprises an encapsulated form.

27. A method according to claim 16, further comprising contacting said meat with a buffering agent.

28. A method according to claim 27, wherein the amount of said buffering agent is sufficient to stabilize the pH in said meat at a pH below the grading pH.

29. A method according to claim 27, wherein said buffering agent comprises a phosphate solution.

30. A method according to claim 16, further comprising contacting said meat with one or more ingredients suitable for accelerating the action of at least one of said at least one pH-lowering agents.

31. A method according to claim 29, wherein the one or more ingredients suitable for accelerating the action of at least one of said at least one pH-lowering agents comprises one or more of erythorbate and ascorbic acid.

32. A method according to claim 1, further comprising cooking the meat product after contacting said meat derived from said dark-cutting carcass with an amount of at least one pH-lowering agent.

33. A method according to claim 16, further comprising cooking the meat product after contacting said meat derived from said dark-cutting bovine carcass with an amount of at least one pH-lowering agent.

* * * * *

UNITED STATES PATENT AND TRADEMARK OFFICE
CERTIFICATE OF CORRECTION

PATENT NO. : 8,580,326 B2  Page 1 of 1
APPLICATION NO. : 10/826957
DATED : November 12, 2013
INVENTOR(S) : Howard G. Dolezal, Jr. et al.

It is certified that error appears in the above-identified patent and that said Letters Patent is hereby corrected as shown below:

In the Specification

In column 6, line 11, delete "10 g" and insert -- 100 g --, therefor.

In column 6, line 45, after "Ohio)" insert -- . --.

In column 10, line 67, delete "calorim-" and insert -- colorim- --, therefor.

In column 12, line 7, delete "calorimeter." and insert -- colorimeter. --, therefor.

Signed and Sealed this
Eighth Day of July, 2014

Michelle K. Lee
*Deputy Director of the United States Patent and Trademark Office*